United States Patent [19]

Nakamura

[11] Patent Number: 5,159,633
[45] Date of Patent: Oct. 27, 1992

[54] MULTIMEDIA NETWORK SYSTEM
[75] Inventor: Kenji Nakamura, Hadano, Japan
[73] Assignee: Canon Kabushiki Kaisha, Tokyo, Japan
[21] Appl. No.: 641,879
[22] Filed: Jan. 15, 1991
[30] Foreign Application Priority Data
  Jan. 19, 1990 [JP] Japan ................ 2-008366
[51] Int. Cl.[5] .............. H04L 9/30; H04N 7/167
[52] U.S. Cl. ......................... 380/30; 380/4;
  380/5; 380/9; 380/10; 380/21; 380/43; 380/49
[58] Field of Search .................. 380/10, 20, 30, 49,
  380/3-5, 9, 21, 43, 50, 46

[56] References Cited

U.S. PATENT DOCUMENTS

| 4,245,245 | 1/1981 | Matsumoto et al. | 380/20 X |
| 4,464,678 | 8/1984 | Schiff et al. | 380/20 X |
| 4,623,920 | 11/1986 | Dufresne et al. | 380/20 |

FOREIGN PATENT DOCUMENTS

| 179612 | 4/1986 | European Pat. Off. . |
| 2161680 | 1/1986 | United Kingdom . |
| 8500718 | 2/1985 | World Int. Prop. O. . |
| 8806826 | 9/1988 | World Int. Prop. O. . |

OTHER PUBLICATIONS

BBC Research Department Report, Aug. 1988, Tadworth, Surrey, UK, pp. 1-18, D. T. Wright, "Conditional Access Broadcasting: Datacare 2, An Over-Air Enabled System For General Purpose Data Channels".

Primary Examiner—Bernarr E. Gregory
Attorney, Agent, or Firm—Fitzpatrick, Cella, Harper & Scinto

[57] ABSTRACT

There is disclosed a multimedia network system for transmitting real-time communication type information such as a television video signal and storage type information such as a computer file using at least one transmission path. The real-time communication type information is encrypted by a secret-key system, and the storage type information is encrypted by a public-key system. A common encryption key of the public-key system is changed in each communication. High-speed information can be safely encrypted and transmitted.

14 Claims, 9 Drawing Sheets

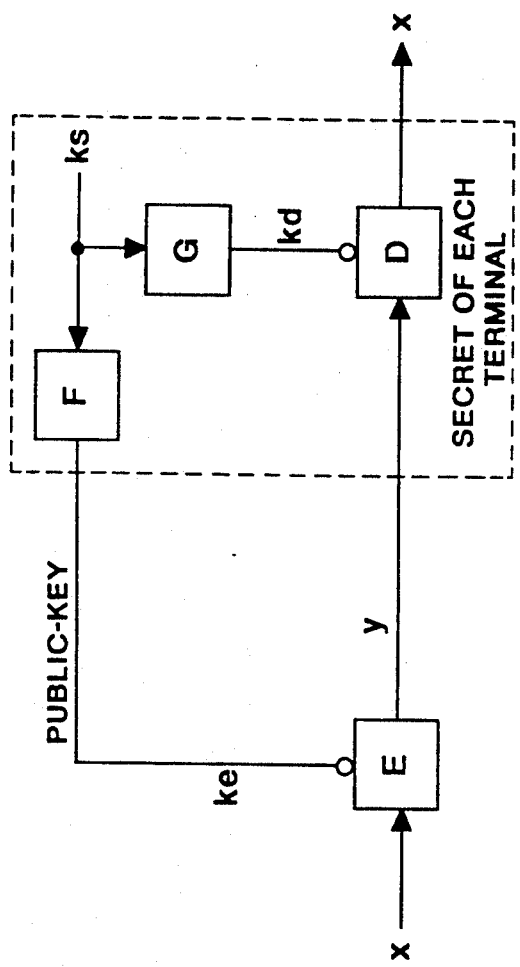
F I G. 4
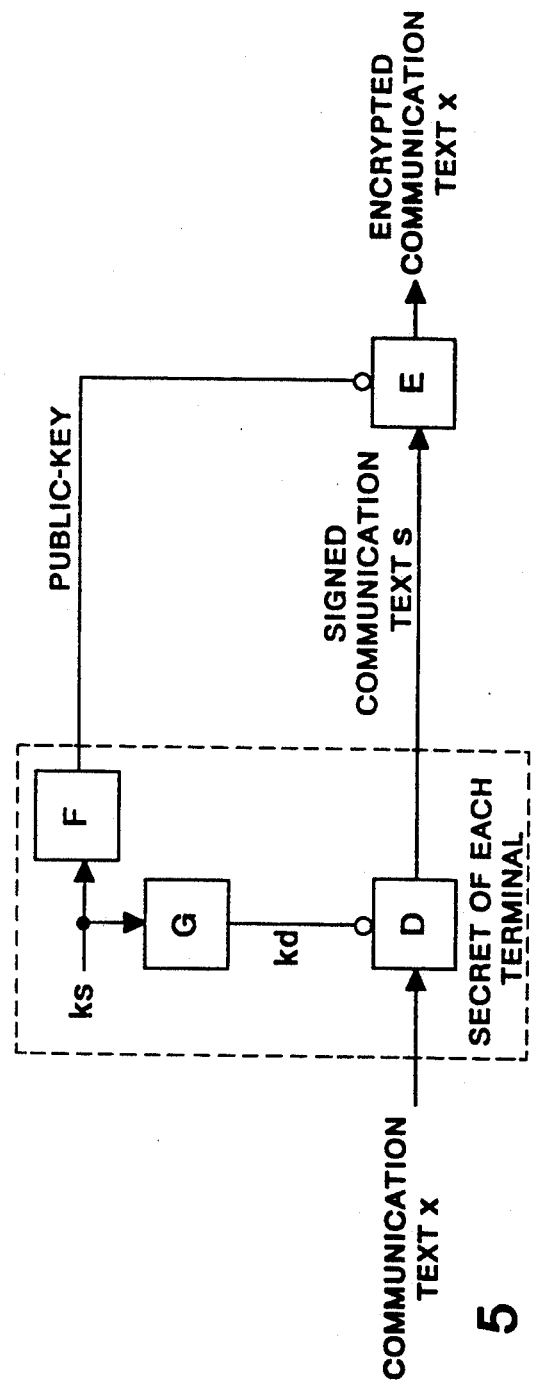
F I G. 5

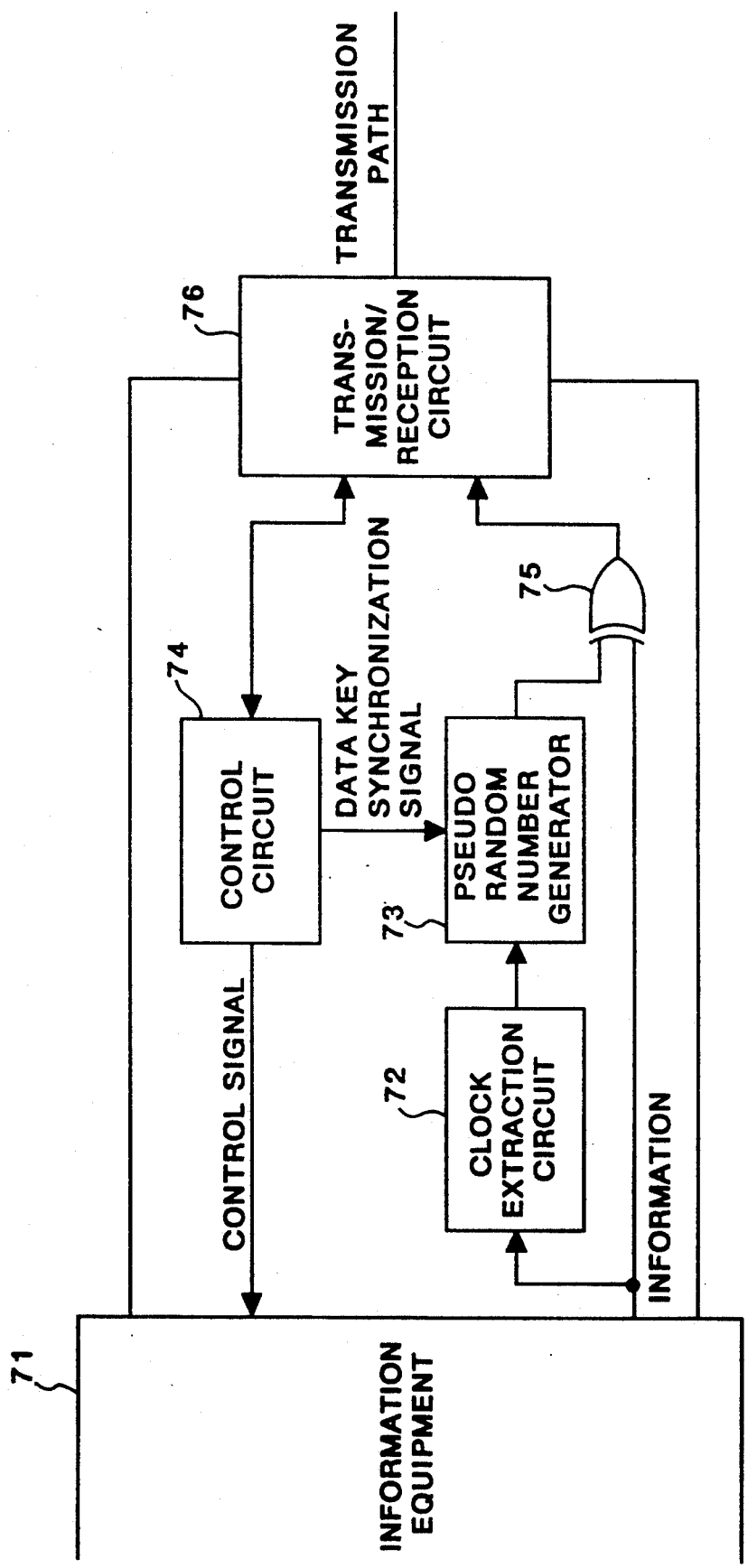
F I G. 7

MULTIMEDIA NETWORK SYSTEM

BACKGROUND OF THE INVENTION

The present invention relates to a multimedia network system for transmitting real-time communication type information such as television video signals, and storage type information such as computer files using at least one transmission path.

In recent years, optical fiber networks have been set up in trunk communication networks, satellite communications have been put into practical applications, and local area networks (LANs) have increasingly been widespread. In order to prevent a communication content from being leaked to a third party other than a party concerned in communications, it is important to constitute a network system which can attain an encryption/privacy function.

So-called information service industries that charge depending upon contents and amounts of information services via such a communication network are growing larger. For this reason, it is also important to simultaneously record and acquire charge information for information services in addition to the encryption/privacy function.

As a conventional information encryption/privacy function system, secret-key cryptosystem and public-key cryptosystem are known.

For further details of these systems, see D. W. Davis, W. L. Pric, "Network Security", edited and translated by Tadahiro Uezono and published by Nikkei McGraw-Hill Co. (1986).

These systems will be briefly described below (for further details, see the above reference).

In the secret-key cryptosystem, transmission and reception terminals share an encryption/decryption key, so that information is encrypted/transmitted and decrypted using this key.

As an encryption system of this type, a large number of systems, e.g., a simple sum encryption/permutation encryption system, an encryption system called "DES" (data encryption standard) which is standardized by U.S. Department of Commerce (National Bureau of Standard), and the like are known.

In the secret-key system, an encryption/decryption key must be determined in advance between transmission and reception terminals, and must be kept secret from a third party. If a third party knows this key, he or she can easily decrypt encrypted information.

In contrast to this, in the public-key cryptosystem, a pair of different encryption and decryption keys are used, and an encryption key is disclosed to all the terminals.

Each terminal has its own encryption key. A transmission terminal selects a key of a destination terminal from the disclosed encryption keys of the respective terminals, and encrypts and transmits information using the selected key. On the other hand, a reception terminal decrypts the received information using a decryption key paired with the selected key.

In this system, since a pair of keys with which a decryption key is difficult to determine from an encryption key are used, even when the encryption key is disclosed, a third party substantially cannot decrypt encrypted information.

Since a secret-key need not be determined in advance between transmission and reception terminals, a key will not be known by a third party when a key is determined in advance between transmission and reception terminals.

However, the above prior art systems suffer from the following drawbacks.

In the secret-key cryptosystem, (1) an encryption/decryption key must be determined in advance between transmission and reception terminals, and a key may be known to a third party during a communication for determining the encryption/decryption key;

(2) even when the same key is repetitively used to avoid such undesirable disclosure of the key, a third party may find out the key upon comparison of a plurality of pieces of information encrypted by the same key; and (3) if complex encryption such as the DES is performed, the above-mentioned possibility can be reduced. However, it is difficult to encrypt data having a large data transfer volume per unit time such as a digital video signal.

In the public-key cryptosystem, (4) it is generally difficult to perform high-speed encryption/decryption processing.

Since the two encryption systems suffer from the above-mentioned drawbacks (1) to (4), it is conventionally difficult to safely encrypt real-time communication type information such as a video signal which must be transmitted at high speed.

SUMMARY OF THE INVENTION

The present invention has been made to solve the above drawbacks, and has as its object to provide a multimedia network system which can encrypt and transmit real-time communication type information such as a video signal which must be transmitted at high speed, so that the encrypted information cannot be easily decrypted.

The present invention comprises the following arrangement as means for achieving the above object.

More specifically, a multimedia network system for transmitting real-time communication type information such as a television video signal and storage type information such as a computer file using at least one transmission path, comprises secret-key encryption means for encrypting the real-time communication type information by secret-key system in which only transmitting and receiving terminals of the information have encryption and decryption keys, public-key encryption means for encrypting the storage type information by a public-key system in which all the terminals commonly have their own encryption keys, and only a receiving terminal of the information has its own decryption key, and secret-key control means for causing the secret-key encryption means to change a common encryption key in each communication, and causing the public-key encryption means to encrypt and transmit the changed key.

The system further comprises time measurement means for measuring an encryption or decryption time of a transmission terminal which performs encryption using a secret-key by the secret-key encryption means or a reception terminal which performs decryption using a secret-key, and charging means for calculating charge information in accordance with information transmission or reception time measured by the time measurement means.

With the above arrangement, since the secret and public key encryption systems are selectively adopted, the drawbacks of the prior arts can be eliminated, and high-speed information can be safely encrypted and transmitted.

More specifically, when real-time communication type information is to be encrypted, the secret-key cryptosystem which can perform high-speed encryption/decryption processing by a relatively simple encryption method is used. Meanwhile, when storage type information is to be encrypted, a communication is performed using the public-key cryptosystem which can reduce a fear of decryption by a third party although it performs encryption/decryption processing at low speed.

When a secret-key for encrypting real-time communication type information is determined in advance, a communication is performed using the public-key cryptosystem used in encryption of storage type information, and the determined secret-key is abandoned after each communication. Thus, the secret-key for encrypting real-time communication type information can be prevented from being found out by a third party, and high-speed information can be safely transmitted.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram showing a function of a portion for performing encryption using a public key in FIGS. 1A and 1B;

FIG. 5 is a diagram showing a function of a portion for putting a digital signature in FIGS. 1A and 1B;

FIG. 7 is a block diagram of an interface for a transmitter in the second embodiment.

DETAILED DESCRIPTION OF THE INVENTION

An embodiment of the present invention will be described in detail hereinafter with reference to the accompanying drawings.

First Embodiment

The first embodiment of the present invention will be described below with reference to FIGS. 1A to 4.

Figure 1A:
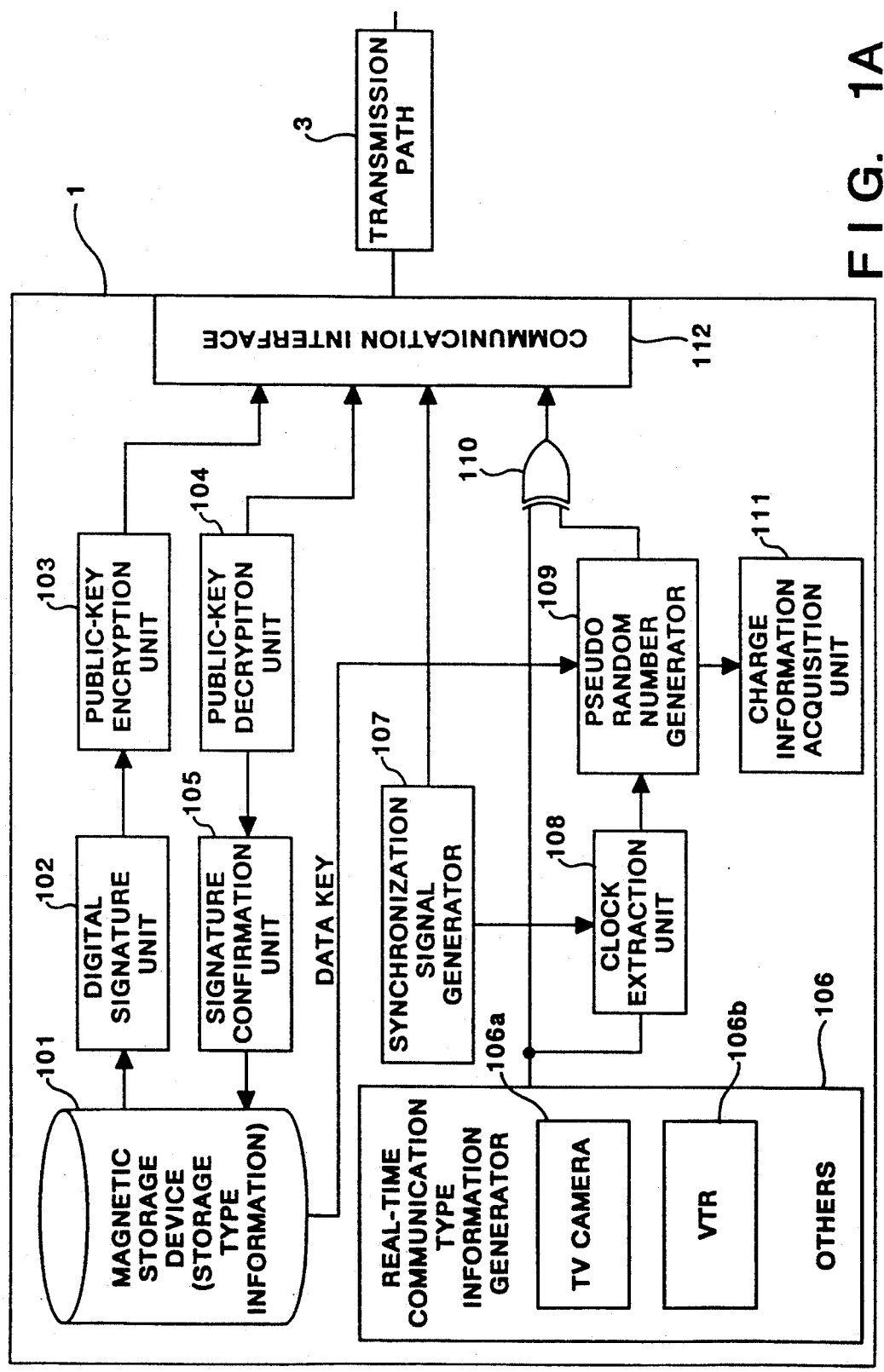
FIGS. 1A and 1B are block diagrams showing the first embodiment according to the present invention.
Figure 1B:
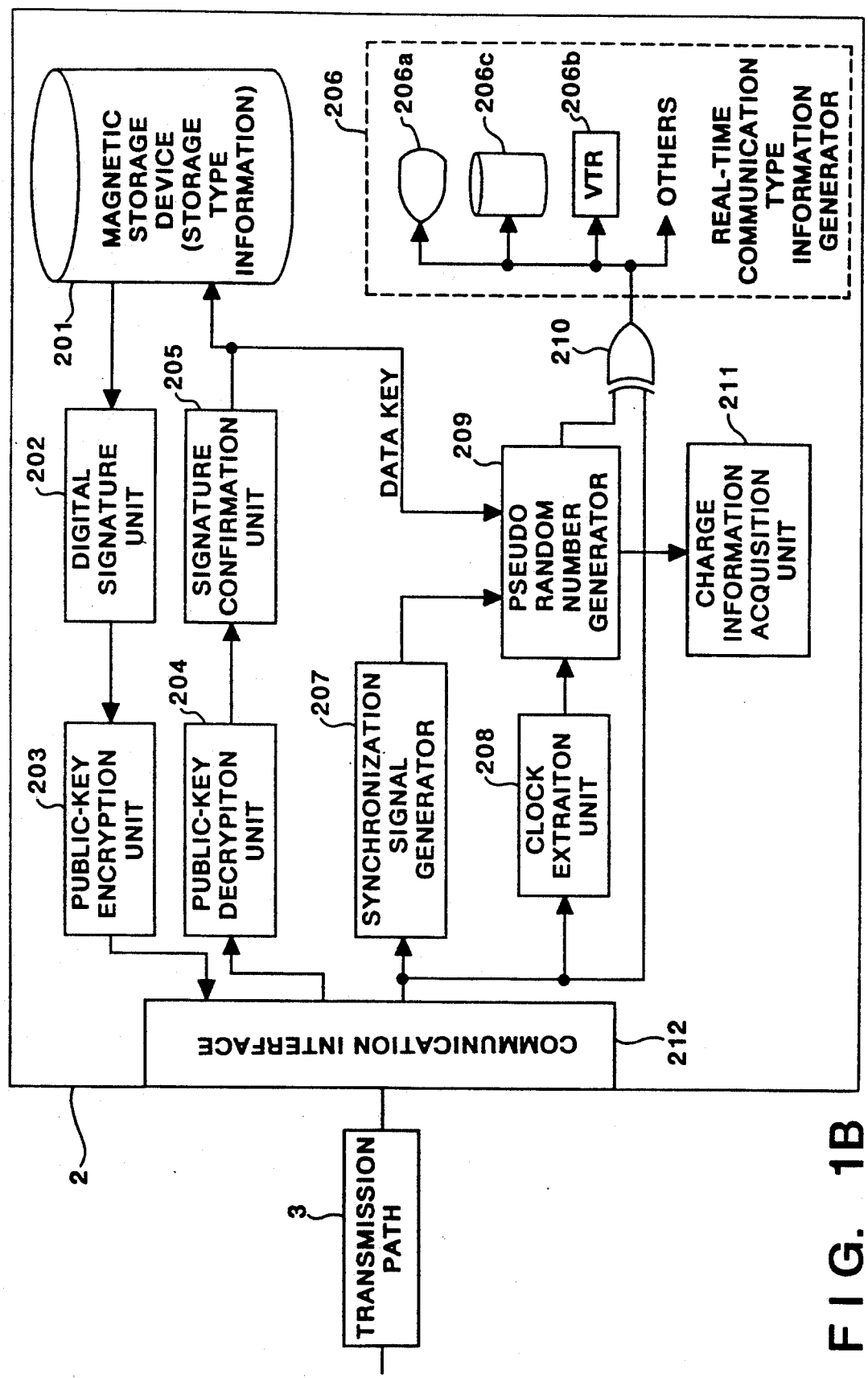
Figure 2:
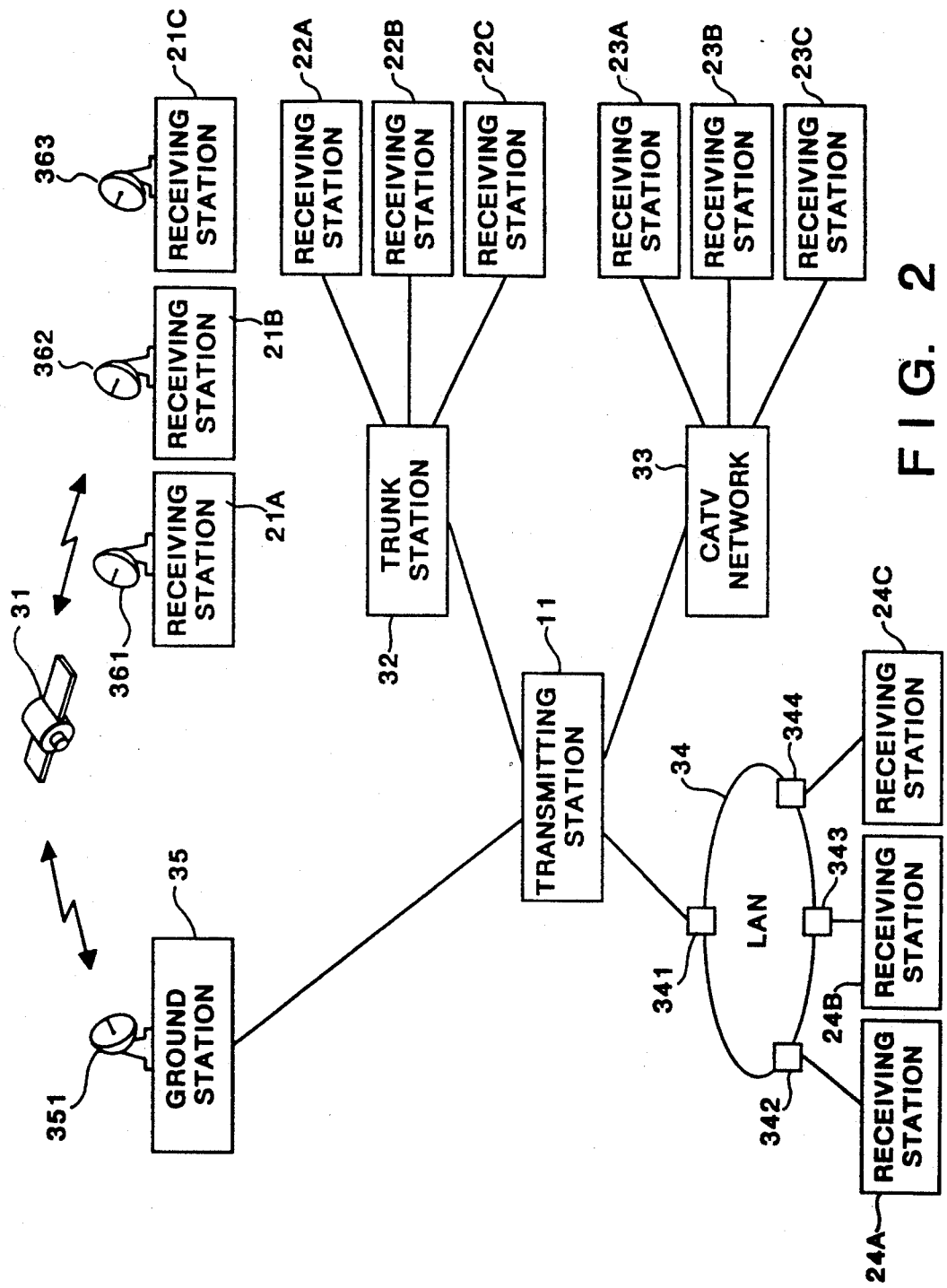
FIG. 2 is a schematic diagram showing a multimedia network system to which the first embodiment is applied.
Figure 3:
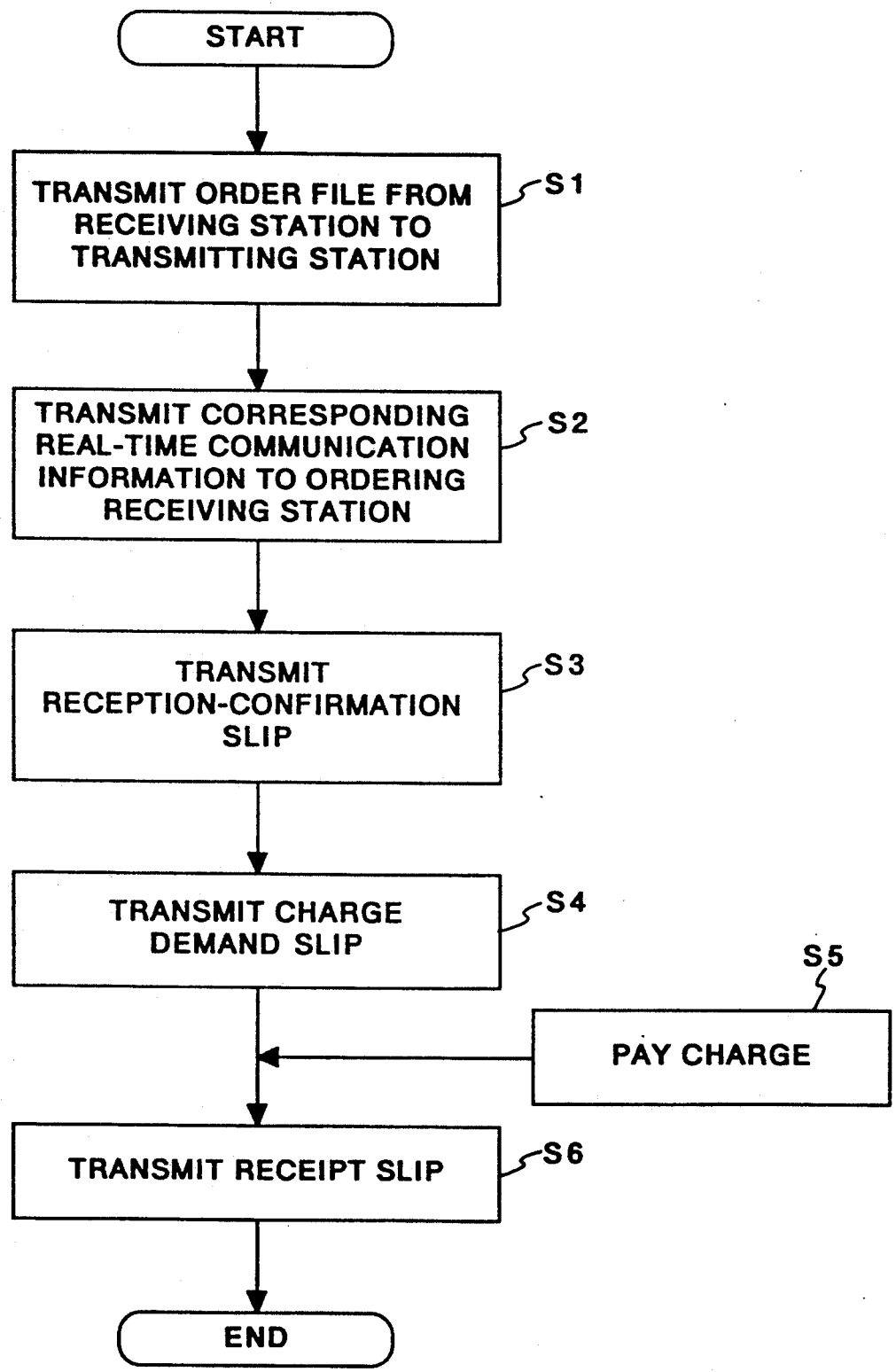
FIG. 3 is a flow chart showing a schematic operation of the first embodiment.

FIGS. 1A and 1B are block diagrams of the first embodiment of the present invention, FIG. 2 is a schematic diagram showing a multimedia network system to which the first embodiment is applied, FIG. 3 is a flow chart showing a schematic operation of the first embodiment, FIG. 4 is a diagram showing a function of a portion for performing encryption using a public-key in FIGS. 1A and 1B, and FIG. 5 is a diagram showing a function of a portion for putting a digital signature in FIGS. 1A and 1B.

In FIGS. 1A and 1B, reference numeral 1 denotes a first terminal for encrypting and transmitting real-time communication type information; 2, a second terminal for receiving and decrypting the encrypted real-time communication type information; and 3, a transmission path.

In the first terminal 1, reference numeral 101 denotes a magnetic storage device for storing storage type information such as computer files, electronic slips, and the like in the transmission terminal 1; 102, a digital signature unit for putting a digital signature for, when storage type information is transmitted, certifying that the information is surely transmitted from the first terminal 1, and is not forged by a third party; 103, a public-key encryption unit for encrypting storage type information using a public encryption key inherent to the second terminal 2 as a destination of information; 104, a public-key decryption unit for decrypting storage type information, which is encrypted using a public encryption key inherent to the first terminal 1 and is transmitted to the first terminal, using a secret decryption key inherent to the terminal 1; 105, a signature confirmation unit for confirming a digital signature for certifying that the storage type information decrypted by the public-key decryption unit 104 is surely transmitted from the second terminal 2, and is not forged by a third party; 106, a real-time communication type information generator, such as a TV camera 106a, a VTR 106b, and the like, for generating digital real-time communication type information; 107, a synchronization signal generator for performing synchronization necessary for communications between the first and second terminals 1 and 2; 108, a clock extraction unit for extracting a clock signal from real-time communication type information from the real-time communication type information generator 106; 109, a pseudo random number generator for generating a pseudo random number string which has a one-to-one correspondence with a data key given from the magnetic storage device 101, and is synchronous with a clock signal from the clock extraction unit 108; 110, an EX-OR gate for logically EX-ORing information from the real-time communication type information generator 106, and the pseudo random number from the pseudo random number generator 109; 111, a charge information acquisition unit for measuring an operation state of the pseudo random number generator 109, and acquiring information associated with a charge to be paid for information to be transmitted; and 112, a communication interface for transmitting information from the public-key encryption unit 103, and a signal from the EX-OR gate 110, and receiving signals from the transmission path 3 and outputting them to the public-key decryption unit 104.

In the second terminal 2, reference numerals 201 to 205 and 212 denote a magnetic storage device, a digital signature unit, a public key encryption unit, a public-key decryption unit, a signature confirmation unit, and a communication interface similar to the components 101 to 105 and 112 in the first terminal. Reference numeral 206 denotes a real-time communication type information processor, comprising, e.g., a CRT 206a, a VTR 206b, a magnetic storage device 206c, and the like, for displaying, storing, and processing real-time communication type information; 207, a synchronization signal extraction unit for extracting a synchronization signal generated by the synchronization signal generator 107 from signals transmitted through the transmission path 3; 208, a received clock extraction unit for extracting a clock component from transmitted signals; 209, a pseudo random number generator for, when the same key as the pseudo random number generator 109 in the first terminal 1 as a transmitter of real-time communication type information is given, generating the same pseudo random number; and 210, an EX-OR gate for logically EX-ORing information received from the communication interface 212 and the pseudo random number from the pseudo random number generator 209.

In FIG. 2, reference numeral 11 denotes a transmitting station, corresponding to the first terminal 1 shown in FIGS. 1A and 1B, for providing information, and receiving a charge for the information; 21A to 21C, 22A to 22C, 23A to 23C, and 24A to 24C, receiving stations, having the same arrangement as the second terminal 2 shown in FIGS. 1A and 1B, for receiving information from the transmitting station 11, and paying the charge for the received information; 31, a communication satellite; 32, a trunk station for providing a trunk communication network using an optical fiber; 33, a communication network such as a CATV; 34, a local area network (LAN); 341 to 344, nodes for exchanging information between the LAN 34 and external stations; 35, a ground station for performing communications between the transmitting station 11 and the communication satellite 31; and 351, and 361 to 363, antennas used in communications between the communication satellite and the ground station.

Note that the transmission path 3 in FIGS. 1A and 1B includes a transmission path using the ground station 35 and the communication satellite 31 shown in FIG. 2, a transmission path using the trunk station 32, a transmission path using the CATV network 33, a transmission path using the LAN 34, and the like.

The schematic operation of the system of this embodiment will be described below with reference to the flow chart shown in FIG. 3.

In the system shown in FIG. 2, the transmitting station 11 provides real-time communication type information such as video information in accordance with requests from the receiving stations 21A to 24C, and this information is transmitted to the requesting receiving station via the communication satellite 31, the trunk station 32, the CATV network 33, or the LAN 34. The receiving station pays the charge for this information. All the pieces of information excluding payment of this charge are transmitted through one of the transmission paths shown in FIG. 2, i.e., in an on-line manner between the transmitting station 11 and the receiving stations 21A to 24C.

The network shown in FIG. 2 must take countermeasures against the following illegal actions (1) to (4).

(1) A third party taps real-time communication type information without paying any charge.

(2) A third party disguises another receiving station, and requests and receives information.

(3) A receiving station alters a demand electronic slip after it receives information.

(4) A receiving station forges a receipt electronic slip without paying a charge.

In this embodiment, in order to prevent such illegal actions, the transmitting station 11 as the first terminal 1 is equipped with the public-key encryption unit 103, the public key decryption unit 104, and the pseudo random number generator 109 shown in FIGS. 1A and 1B, and each of the receiving stations 21A to 24C as the second terminals is equipped with the public-key encryption unit 203, the public-key decryption unit 204, and the pseudo random number generator 209.

Therefore, a procedure from when each receiving station requests information until it pays a charge is as follows.

In step S1, a file (electronic slip) for ordering information is transmitted from a given receiving station to the transmitting station 11. This file is encrypted/decrypted by a public-key system (to be described later) when it is transmitted/received. The transmitting station which received the file transmits real-time communication type information according to the file to the ordering receiving station in step S2. The transmission information is encrypted/decrypted by a secret-key system, as will be described later.

In step S3, the receiving station transmits an electronic slip for confirming reception to the transmitting station 11. In step S4, the transmitting station 11 transmits a charge demand electronic slip to the receiving station. The electronic slip is encrypted/decrypted by the public-key system (to be described later) when it is transmitted/received.

The receiving station pays the charge using a means outside a network in step S5. The transmitting station 11 which confirmed the payment transmits a receipt electronic slip to the ordering receiving station in step S6. This electronic slip is also encrypted/decrypted by the public-key system (to be described later) when it is transmitted/received.

Information is provided and a charge is paid via the above-mentioned procedure.

Encryption/decryption processing of this embodiment in the information communication sequence shown in FIG. 3 which has been schematically described above will be described in detail below.

In this embodiment, real-time communication type information is encrypted/decrypted by the secret-key system using the pseudo random number generators 109 and 209 when it is transmitted/received.

In contrast to this, electronic slips are encrypted by the public-key system using the corresponding encryption and decryption units.

Encryption/decryption of real-time communication type information by the secret-key system of this embodiment will be briefly described below.

The transmitting station 11 of this embodiment logically EX-ORs a string of real-time communication type information to be transmitted and a pseudo random number string generated by the pseudo random number generator 109 based on a data encryption key from the magnetic storage device 101, thereby encrypting and transmitting the real-time communication type information.

A receiving station logically EX-ORs the encrypted signal and a pseudo random number string which is generated by the pseudo random number generator 209 based on a data encryption key from the magnetic storage device 201 and is the same as that generated by the pseudo random number generator 109 of the transmitting station 11, thereby decrypting the information.

In the above description, the transmitting station and the receiving station employ the same pseudo random number generator. Therefore, when the same data encryption key is given to these generators, the same pseudo random number string can be generated.

The public-key encryption/decryption system of this embodiment will be described below.

In this embodiment, the public-key system is used to encrypt and transmit information request and receipt data, charge demand and receipt electronic slips, and a data encryption key in the secret-key system.

When the data encryption key in the secret-key system which is transmitted from the transmitting station 11 to a source receiving station in advance is encrypted and transmitted by the public-key cryptosystem, the key can be prevented from being known to a third party. The key is changed for each communication, so that an encryption pseudo random number string can be prevented from being found out upon comparison of a plurality of communication texts.

Since this embodiment employs these encryption systems, real-time communication type information having a high bit rate can be safely encrypted at high speed in real time.

In this embodiment, in order to particularly prevent the above-mentioned illegal actions (2) to (4), electronic slips are encrypted/decrypted by the public-key system, and the terminals have a function of performing a digital signature and a function of confirming the digital signature using the digital signature units 102 and 202, and the signature confirmation units 105 and 205 for certifying a transmission source simultaneously with encryption.

Thus, in particular, the illegal actions (2) to (4) described above can be effectively prevented. For this reason, when an electronic slip is forged by a third party or is altered after transmission, such forgery or alteration can be detected.

The above-mentioned public-key cryptosystem and the digital signature function of this embodiment will be described below with reference to FIGS. 4 and 5.

The public-key cryptosystem of this embodiment will first be described in detail with reference to FIG. 4.

In FIG. 4, an input "x" represents non-encrypted information such as an electronic slip or a data encryption key; "ke", a key used for encrypting information by the public-key cryptosystem; "E", an encryption unit for encrypting the information "x" using the key "ke"; "y", information encrypted by the encryption unit E; "kd", a key used for decryption; "D", a decryption unit for decrypting the encrypted information "y" using the key "kd"; "ks", information for determining a pair of the encryption key "ke" and the decryption key "kd"; and "F" and "G", devices for respectively generating the encryption key "ke" and the decryption key "kd" based on the information "ks".

The information "ks" and the decryption key "kd" are preserved as secret information inherent to each terminal so as not be disclosed outside the terminal. In contrast to this, the encryption key "ke" is disclosed to all the terminals as public information inherent to each terminal.

In the above arrangement, a transmitting terminal encrypts information using the public encryption key inherent to a destination terminal to which information is to be transmitted, and transmits the encrypted information. The encryption key "ke" and the decryption key "kd" are paired. In this case, a pair of keys with which the decryption key "kd" cannot be presumed from the encryption key "ke" are used. Such a pair of keys are generated by utilizing a function called a one way function.

As an example of the one way function, if two relatively prime integers are represented by "p" and "q", their product "n" is given by (n=p·q). More specifically, "n" can be easily calculated from "p" and "q", but it is difficult to obtain "p" and "q" from "n". By utilizing this fact, the above-mentioned pair of keys can be generated.

In this embodiment, information is encrypted using a public encryption key, and the encrypted information is transmitted. The encrypted information is decrypted using a secret decryption key which cannot be presumed from the encryption key, so that safe encryption transmission can be guaranteed without transmitting a decryption key.

The digital signature function of this embodiment will be described in detail below with reference to FIG. 5.

In FIG. 5, reference symbol "s" denotes a signed communication text. The same reference symbols denote the portions having the same functions as in FIG. 4, and a detailed description thereof will be omitted.

In the above arrangement, when a digital signature is transmitted, a transmitting terminal decrypts original information using its own decryption key, and transmits the decrypted information. A receiving terminal encrypts the decrypted information using a public encryption key. Since encryption and decryption have a mathematically inverse-functional relationship, even when the above operations are performed, the received and encrypted information can be restored to the original one before being subjected to decryption in the transmitting terminal. The decryption key "kd" is preserved as a secret method of a transmitting terminal, as described above, and cannot be presumed from the public encryption key "ke". Therefore, the receiving terminal encrypts the transmitted signed communication text "s" using the public encryption key, thereby obtaining information "x" as an original communication text.

As a result, it can be certified that this information "x" is surely issued from a terminal which discloses the encryption key. Information forged by a third party who does not know a decryption key becomes one which is not subjected to proper encryption processing. Even if information is encrypted by an improper encryption key, a nonsense signal (information) can only be obtained.

Detailed roles of the respective units when the above-mentioned processing operations are performed will be described below along an actual procedure.

In the following description, a case will be exemplified wherein the receiving station 24B receives information from the transmitting station 11, and pays a charge for the received information. The same applies to communications of other stations, as a matter of course.

The receiving station 24B as the terminal 2 shown in FIGS. 1A and 1B executes processing in step S1 shown in FIG. 3. More specifically, the terminal 24B generates an electronic slip for requesting real-time communication type information (order slip) in the magnetic storage device 201. Subsequently, the digital signature unit 202 puts a digital signature on this electronic slip using a secret signature decryption key inherent to the receiving station 24B. Furthermore, the encryption unit 203 encrypts the electronic slip including the digital signature using a public encryption key inherent to the transmitting station 11, and transmits the encrypted slip to the transmission path 3 via the communication interface 212.

The receiving station 24B is connected to the LAN 34 via the node 343, and the signed encrypted slip from the receiving station 24B is sent to the LAN 34 via the node 343. The encrypted slip is then sent to the transmitting station 11 via the nodes 344 and 341.

This slip is fetched in the transmitting station 11 by the communication interface 112. This signal is decrypted by the public-key decryption unit 104 using a secret decryption key inherent to the transmitting station 11. The decrypted information includes the digital signature transmitted from the receiving station 24B, and the signature confirmation unit 105 confirms the digital signature transmitted from the receiving station 24B, thus certifying that the electronic slip is sent from the receiving station 24B. This electronic slip is stored in the magnetic storage device 101.

The transmitting station 11 then executes processing in step S2 shown in FIG. 3. More specifically, the station 11 determines a secret-key encryption data key used when real-time communication type information is transmitted. The station 11 causes the digital signature unit 102 to put a signature on the data key. The public-key encryption unit 103 then encrypts the data key using a public key. The data key is transmitted to the receiving station 24B. The receiving station 24B decrypts the received signal, confirms the signature, and receives the data key. The station 24B sets up the pseudo random number generator 209 using this data key to prepare for reception of real-time communication type information. Thereafter, the receiving station 24B sends, to the transmitting station 11, a message indicating that the station 24B is ready for reception.

When the transmitting station 11 receives the reception ready message, it sets up the pseudo random number generator 109 using the same data key as that transmitted to the receiving station 24B, and thereafter, energizes the synchronization signal generator 107 to generate a synchronization signal. The station 11 then starts an operation of a requested device of the real-time communication type information generator 106, and logically EX-ORs a signal train output from this device and a pseudo random number string, thereby encrypting the signal train. The station 11 transmits the encrypted signal train to the receiving station 24B via the communication interface 112. In the receiving station 24B which received the encrypted signal train via the communication interface 212, the synchronization signal extraction unit 207 detects a synchronization signal in this signal train to start the pseudo random number generator 209.

The EX-OR gate 210 logically EX-ORs the encrypted real-time communication type information from the transmitting station 11, and a pseudo random number string generated by the pseudo random number generator 209, thereby decrypting the information. The decrypted information is input to the CRT 206a, the VTR 206b, and the like.

The pseudo random number generators 109 and 209 of the transmitting station 11 and the receiving station 24B are respectively connected to the charge information acquisition units 111 and 211 for measuring operation times of their own apparatuses and acquiring charge information. The charge information acquisition units 111 and 211 allow demand and payment of a charge corresponding to a transmitted information volume.

In this embodiment, since the charge information acquisition units 111 and 211 for measuring operation times of their own apparatuses and acquiring charge information are connected, the acquired charge information is output to, e.g., a display, so that both the transmitting and receiving stations can grasp the charge information. Thus, preparation for a later payment can be smoothly performed.

When the acquired charge information is transmitted at the end of a communication, a future trouble can be prevented.

Upon completion of transmission of the real-time communication type information, the receiving station 24B executes processing in step S3 in FIG. 3. More specifically, the station 24B puts a signature on and encrypts a receipt electronic slip (reception confirmation slip) under the same control as described above, and sends it to the transmitting station 11.

The transmitting station 11 similarly puts a signature on and encrypts a charge demand electronic slip, and sends it to the receiving station 24B in step S4 in FIG. 3.

The receiving station 24B pays the charge to the transmitting station 11 via a bank or by another method in step S5.

The transmitting station 11 puts a signature on and encrypts a receipt electronic slip, and sends it to the receiving station 24B in step S6, thus completing a unit of information service transaction.

As described above, since this embodiment executes the above-mentioned procedure, real-time communication type information can be safely encrypted and transmitted at high speed in real time while an encryption key is prevented from being known to or presumed by a third party. In addition, electronic slips can be prevented from being forged or altered.

Since all the communication texts are encrypted, a third party cannot know contents of information transactions. Therefore, not only contents but also the presence/absence of communications can be kept secret.

Another Embodiment

The present invention is not limited to the encryption/decryption processing in the above-mentioned system, and is not limited to the arrangement and control of the above embodiment, either. The encryption/decryption processing of the present invention is applicable to various other data transmission systems.

The second embodiment of the present invention in which the present invention is applied to another system will be described below with reference to FIGS. 6A to 8.

Figure 6A:
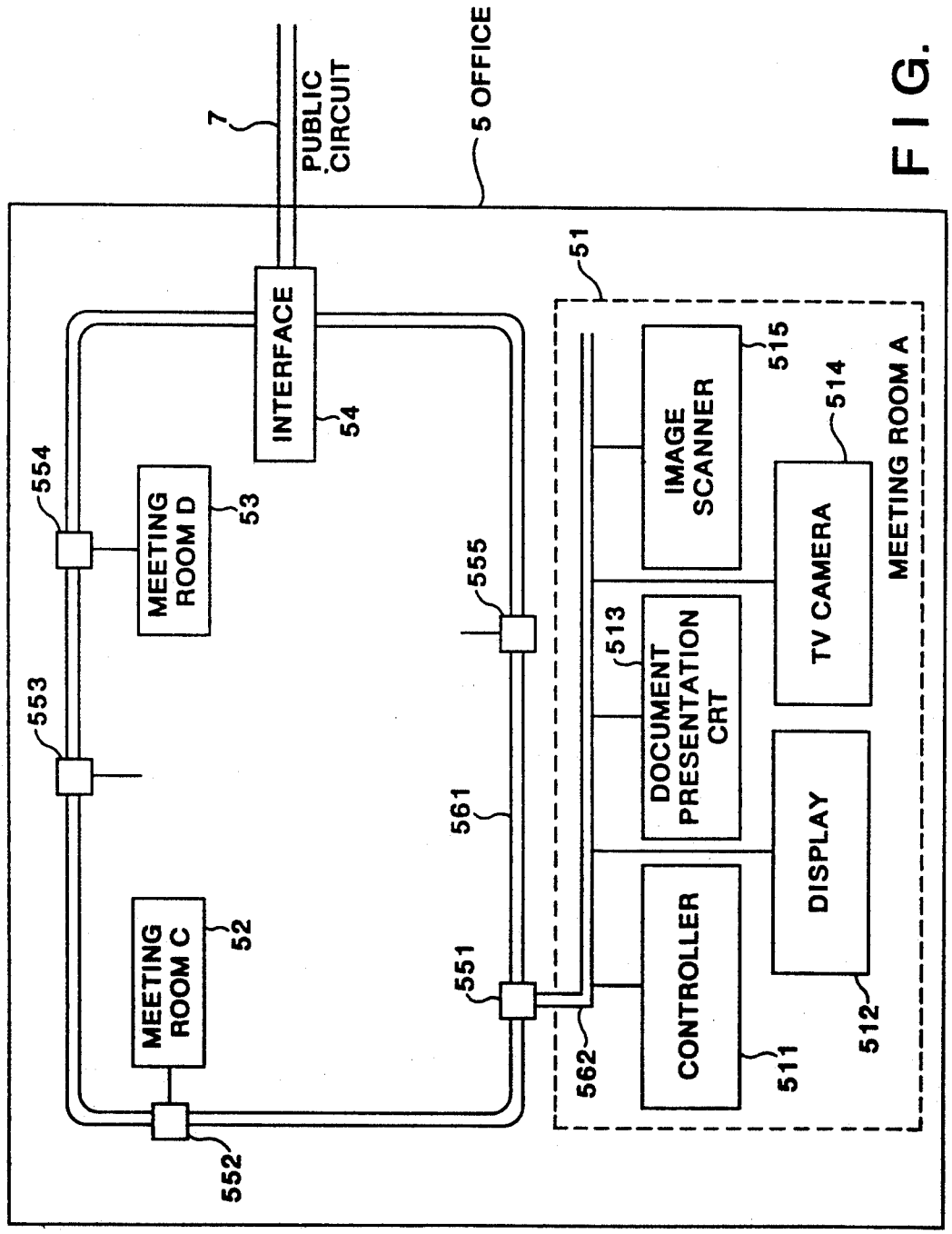
FIGS. 6A and 6B are block diagrams of a meeting system according to the second embodiment of the present invention.
Figure 6B:
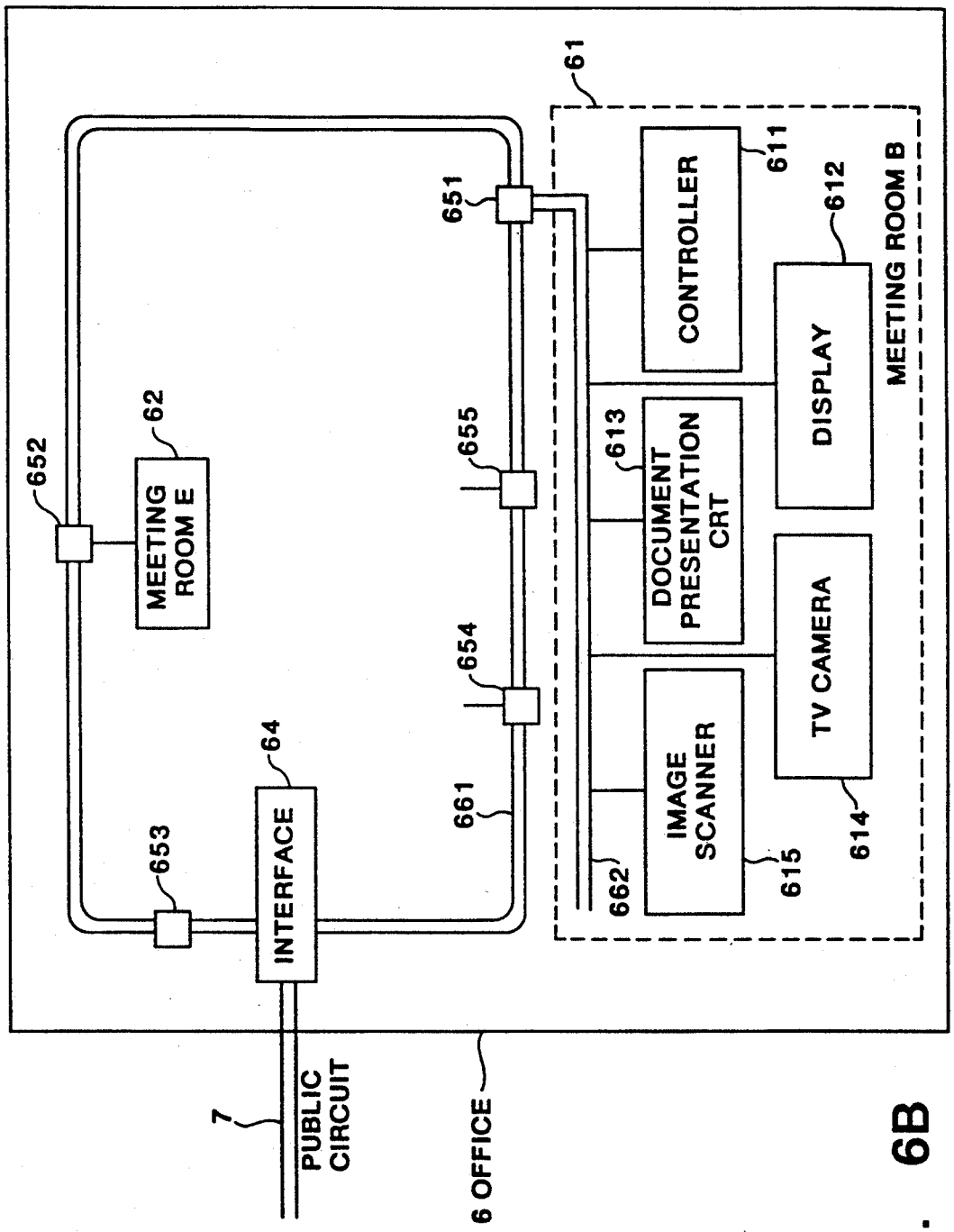

In recent years, a meeting system utilizing a network, so-called, an electronic meeting or television meeting system, has become increasingly popular. Such a meeting system utilizes a LAN provided in an office and a public circuit to exchange signals from a television camera for picking up images of men or articles, a document image, or signals from an image scanner between meeting rooms at remote locations. In general, a plurality of electronic meeting rooms are connected to the LAN provided in the office, and information is transmitted through a public circuit network. Therefore, in order to prevent a meeting from being intercepted by another meeting room or to prevent information being tapped by a third party, information must be encrypted. FIGS. 6A and 6B are schematic block diagrams of the meeting system of this embodiment. In FIGS. 6A and 6B, reference numeral 5 denotes a first office in a given enterprise; and 6, a second office of the given enterprise. These two offices are connected through a public circuit 7.

In the first office 5, reference numeral 51 denotes a first meeting room A of the office 5; 52 and 53, second and third meeting rooms C and D of this office; 511 to 515, devices equipped in the meeting room A (reference numeral 511 denotes a controller; 512, a display; 513, a document presentation CRT; 514, a television camera; and 515, an image scanner); 551 to 555, nodes; 561, a transmission line of the LAN; and 562, a transmission path branching from the LAN. These transmission lines comprise coaxial cables or optical fiber cables.

In the second office 6, meeting rooms B 61 and E 62, nodes 651 to 655, an interface 64, and transmission paths 661 and 662 which are the same as those in the office 5 are equipped.

Figure 8:
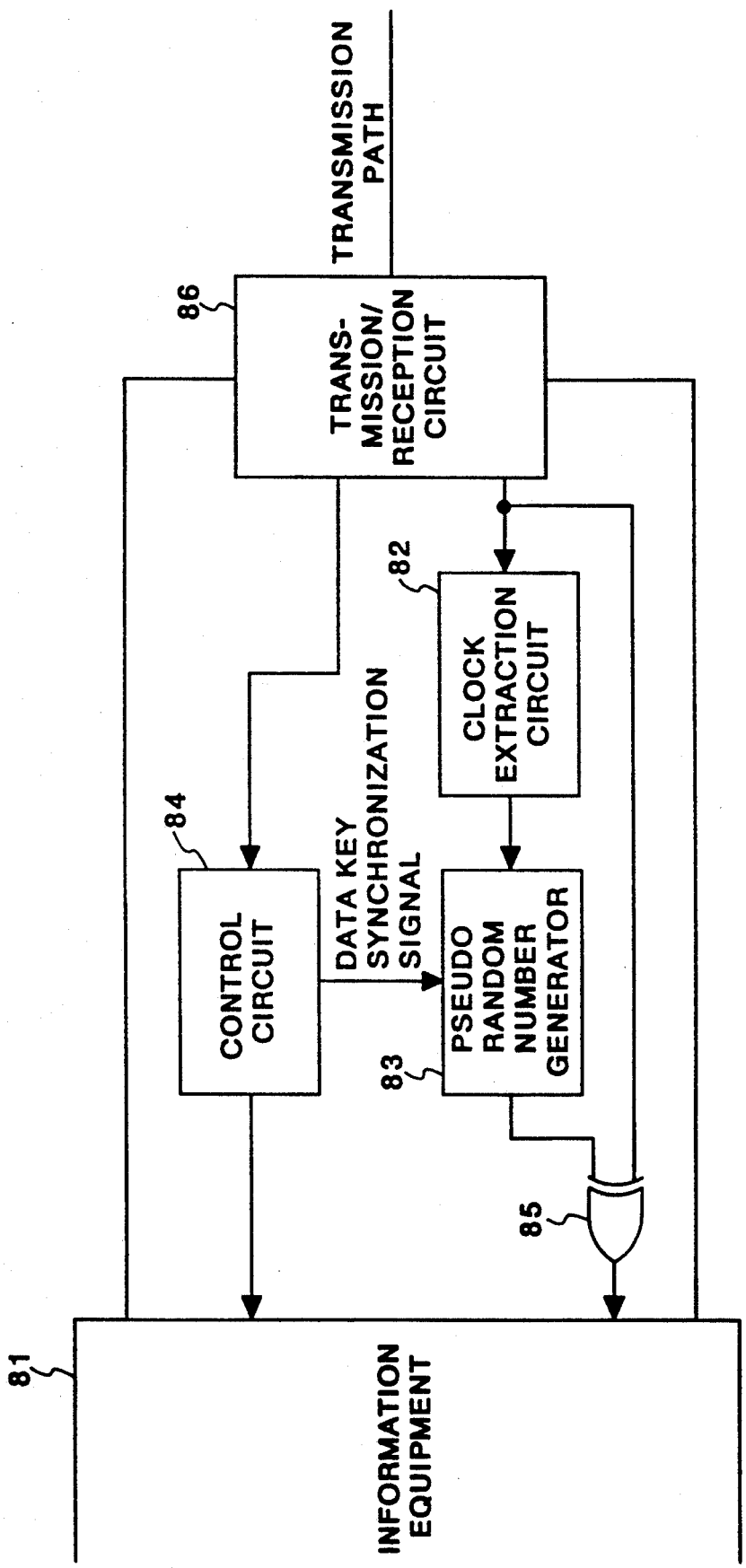
FIG. 8 is a block diagram of an interface for a receiver in the second embodiment.

FIGS. 7 and 8 show schematic arrangements of communication interfaces for executing encryption of the respective devices excluding the controllers equipped in the meeting rooms shown in FIGS. 6A and 6B in the meeting system of this embodiment with the above arrangement.

FIG. 7 is a diagram of an interface for a transmitting equipment such as the television camera, the image scanner, or the like for transmitting information, and FIG. 8 is a diagram of an interface for a receiving equipment such as the display, the CRT, or the like for receiving information.

In FIGS. 7 and 8, reference numerals 71 and 81 denote these information equipments; 72 and 82, clock extraction circuits for extracting clock components from information signals; 73 and 83; pseudo random number generators; 74 and 84, control circuits for controlling synchronization of communications, generation of pseudo random numbers, automatic operations of the information equipments, and the like; 75 and 85, EX-OR gates for logically EX-ORing signals; and 76 and 86, transmission/reception circuits for transmitting/receiving signals onto/from transmission lines.

The operation of this embodiment with the above arrangement will be described below. In the following description, a case will be exemplified below wherein a meeting is performed between the meeting rooms A 51 and B 61. The meeting rooms 52, 53, 62, and the like have the same functions as those of these meeting rooms, and the same operations are performed among other meeting rooms, as a matter of course.

Assume that the controllers of the meeting rooms, e.g., the controllers 511 and 611 have an information encryption function by the public-key cryptosystem described in the first embodiment.

The controller 511 of the meeting room 51 determines a data key for the secret-key cryptosystem for the equipments in the meeting rooms 51 and 61 prior to the meeting between the meeting rooms 51 and 61. The controller 511 encrypts data key by the same public-key system as in the first embodiment, and transmits it to the controller 611 of the meeting room 61. The controller 511 then transmits the data key to the control circuits 74 and 84 of all the equipments in the meeting room 51, thereby setting up encryption communication interfaces of these equipments.

The controller 611 similarly transmits the data key to the controllers of the equipments in the meeting room 61, thereby setting up the interfaces.

Thereafter, the respective equipments are synchronized using synchronization signals therefrom, and a communication is started.

In this state, information from each transmitting equipment is logically EX-ORed with a pseudo random number string based on the predetermined data key so as to be encrypted, and the encrypted information is transmitted. Each receiving equipment decrypts the signal using the same pseudo random number string, and receives it. Encryption/decryption during these operations are performed in the same manner as in the first embodiment described above.

When the electronic meeting is performed in this manner, it can be prevented from being intercepted from, e.g., the meeting room C 52 or D 53.

The information can also be prevented from being tapped by a third party during transmission along the public circuit.

The first and second embodiments of the present invention have been described in detail. However, the application range of the present invention is not limited to these embodiments.

More specifically, in multimedia networks for transmitting real-time communication type information which must be encrypted in real time, and storage type information which requires safety-guaranteed encryption and certification of an information source via the same medium, the present invention is applicable to various other systems, and does not depend on network systems, and kinds of terminals.

As described above, according to the present invention, in a multimedia network for communicating real-time communication type information and storage type information, the real-time communication type information is encrypted by the secret-key system, and the storage type information is encrypted by the public-key system. In addition, a data key in the secret-key system is encrypted by the public-key system, and the encrypted key is transmitted.

For this reason, in particular, real-time communication type information can be encrypted more safely at higher speed.

Since a means for measuring an operation time of secret-key encryption device is arranged, charge information for the transmitted information can be acquired by a simple device.

As many apparently widely different embodiments of the present invention can be made without departing from the spirit and scope thereof, it is to be understood that the invention is not limited to the specific embodiments thereof except as defined in the appended claims.

What is claimed is:

1. A multimedia network system for transmitting real-time communication type information and storage type information using at least one transmission path, comprising:

a transmitting terminal comprising secret-key encryption means for encrypting the real-time communication type information by a secret-key system in which only transmitting and receiving terminals of the information have encryption and decryption keys, public-key encryption means for encrypting the storage type information by a public-key system in which all the terminals commonly share their own encryption keys, and only a receiving terminal of the information has its own decryption key, and control means for causing said secret-key encryption means to change a common encryption key in each communication, and causing said public-key encryption means to encrypt and transmit the changed key.

2. A multimedia network system for communicating real-time communication type information and storage type information using at least one transmission path, comprising:

a receiving terminal comprising secret-key decryption means for decrypting the real-time communication type information by a secret-type system in which only transmitting and receiving terminals of the information have encryption and decryption keys, public-key decryption means for decrypting the storage type information by a public-key decryption means for decrypting the storage type information by a public-key system in which all the terminals commonly share their own encryption keys, and only a receiving terminal of the information has its own decryption key, and secret-key control means for causing said secret-key decryption means to change a common decryption key in each communication.

3. A multimedia network system for transmitting real-time communication type information and storage type information using at least one transmission path, comprising:

a transmitting terminal comprising secret-key encryption means for encrypting the real-time communication type information by a secret-key system in which only transmitting and receiving terminals of the information have encryption and decryption keys, public-key encryption means for encrypting the storage type information by a public-key system in which all the terminals commonly share their own encryption keys, and only a receiving terminal of the information has its own decryption key, and first control means for causing said secret-key encryption means to change a common encryption key in each communication, and causing said public key encryption means to encrypt and transmit the changed key; and a receiving terminal comprising a secret-key decryption means for decrypting the real-time communication type information by secret-key system in which only transmitting and receiving terminals of the information have encryption and decryption keys, public-key decryption means for decrypting the storage type information by a public-key system in which all the terminals commonly have their own encryption keys, and only a receiving terminal of the information has its own description key, and second control means for causing said secret-key decryption means to change a common decryption key in each communication.

4. The system according to claim 3, wherein said transmitting terminal for performing encryption using the secret-key by said secret-key encryption means or said receiving terminal for performing decryption using the secret-key by said secret-key decryption means further comprises time measurement means for measuring an encryption or decryption time, and charge means for calculating charge information in accordance with a transmission or reception time of information measured by said time measurement means.

5. The system according to claim 3, wherein a file for ordering information from said receiving terminal to said transmitting terminal, and the real-time communication type information transmitted from said transmitting terminal to said receiving terminal in accordance with the file are encrypted using the secret-key by said secret-key encryption means, and a reception confirmation file for the real-time communication type information, which file is transmitted from said receiving terminal to said transmitting terminal, and a charge demand file from said transmitting terminal to said receiving terminal are encrypted by said public key encryption means, and are decrypted by the decryption key inherent to said receiving terminal.

6. The system according to claim 5, wherein said secret-key encryption means of said transmitting terminal encrypts real-time communication type information by logically EX-ORing a real-time communication type information string and a pseudo random number string generated based on the stored data encryption key, and transmits the encrypted real-time communication type information.

7. The system according to claim 5, wherein said secret-key encryption means of said receiving terminal decrypts real-time communication type information by logically EX-ORing a received real-time communication type information string and a pseudo random number string generated based on the stored data encryption key.

8. The system according to claim 5, wherein
said transmitting terminal further comprises digital signature means for putting a digital signature for certifying a transmission source simultaneously with encryption when files are transmitted, and
said receiving terminal further comprises confirmation means for confirming the digital signature.

9. A data communication method for transmitting data from a first terminal to a second terminal, comprising the steps of:
encrypting data, which is requested for transmission by the second terminal, using a secret-key cryptographic system in the first terminal;
transmitting the data encrypted by the secret-key cryptographic system from the first terminal to the second terminal;
decrypting the data encrypted by the secret-key cryptographic system and received from the first terminal in the second terminal;
encrypting an electronic slip corresponding to the transmission of the data encrypted by the secret-key cryptographic system using a public-key cryptographic system in one of said first and second terminals;
sending the electronic slip encrypted by the public-key cryptographic system to the other one of said first and second terminals; and
decrypting the encrypted electronic slip in the other one of said first and second terminal.

10. The method according to claim 9, further comprising the steps of:
determining a common secret kay for the secret-key cryptographic system in the first terminal;
encrypting the common secret key by the public-key cryptographic system in the first terminal;
transmitting the common secret key from the first terminal to the second terminal; and
decrypting the encrypted common secret key received from the first terminal in the second terminal.

11. The method according to claim 9, further comprising the steps of:
measuring a time for encrypting data by the secret-key cryptographic system in the first terminal; and
calculating a charge in accordance with the measuring time.

12. The method according to claim 9, further comprising the steps of:

measuring a time for decryption data by a secret-key decryptographic system in the second terminal; and calculating a charge in accordance with the measured time.

13. The method according to claim 9, further comprising the steps of:

generating a digital signature in the one of the first and second terminals by decrypting a text in accordance with a respective decryption key for the public-key cryptographic system;

adding the digital signature to the electronic slip to be transmitted;

confirming the digital signature in the other one of the first and second terminals by encrypting in accordance with a public encryption key, specific to the one of the first and second terminals, for the public-key cryptographic system.

14. A data communication method for transmitting data from a first terminal to a second terminal, comprising the steps of:

encrypting, in the second terminal, a request to the first terminal for data transmission by a public-key cryptographic system;

sending the encrypted request from the second terminal to the first terminal;

decrypting the encrypted request received from the second terminal in the first terminal;

encrypting data corresponding the decrypted request by a secret-key cryptographic system in the first terminal;

transmitting the encrypted data from the first terminal to the second terminal; and decrypting the encrypted data received from the first terminal in the second terminal.

* * * * *

UNITED STATES PATENT AND TRADEMARK OFFICE
CERTIFICATE OF CORRECTION

PATENT NO. : 5,159,633
DATED : October 27, 1992
INVENTOR(S) : KENJI NAKAMURA

It is certified that error appears in the above-identified patent and that said Letters Patent is hereby corrected as shown below:

COLUMN 1

Line 61, "keys with" should read --keys are used with--.
Line 63, "key are used," should read --key,--.

COLUMN 5

Line 57, "disguises" should read --disguises itself as--.

COLUMN 13

Line 5, "secret-type" should read --secret-key--.
Line 35, "public key" should read --public-key--.
Line 46, "description" should read --decryption--.

COLUMN 14

Line 3, "public key" should read --public-key--.
Line 49, "terminal." should read --terminals.--.
Line 52, "kay" should read --key--.
Line 65, "measur-" should read --measured--.
Line 66, "ing" should be deleted.

UNITED STATES PATENT AND TRADEMARK OFFICE
CERTIFICATE OF CORRECTION

PATENT NO. : 5,159,633
DATED : October 27, 1992
INVENTOR(S) : KENJI NAKAMURA

It is certified that error appears in the above-identified patent and that said Letters Patent is hereby corrected as shown below:

<u>COLUMN 15</u>

Line 1, "decryption" should read --decrypting--.

Signed and Sealed this

Twenty-fourth Day of May, 1994

Attest:

BRUCE LEHMAN

Attesting Officer        Commissioner of Patents and Trademarks